United States Patent Office

3,830,724
Patented Aug. 20, 1974

---

3,830,724
HYDROCRACKING PROCESS
Hans U. Schutt, Houston, Tex., assignor to
Shell Oil Company
No Drawing. Filed Oct. 19, 1972, Ser. No. 298,897
Int. Cl. C10g 13/02; C01b 33/28
Int. Cl. 208—111
7 Claims

ABSTRACT OF THE DISCLOSURE

A process for hydrocracking a hydrocarbon feedstock by contacting the hydrocarbons under hydrocracking conditions and in the presence of hydrogen with a catalyst having Group VIII and/or Group VI–B metals incorporated into a mixed zeolite support consisting of channel pore structure and three-dimensional pore structure zeolites of low-alkali metal content.

RELATED APPLICATION

This application is related to applicant's two co-pending applications, Ser. No. 298,898 and Ser. No. 298,920, both filed on Oct. 19, 1972, relating to a hydroisomerization process and novel hydroconversion catalyst, respectively.

BACKGROUND OF THE INVENTION

Field of the Invention

This invention relates to a hydrocracking process which uses certain mixed crystalline aluminosilicate base hydrocarbon conversion catalysts.

Description of the Prior Art

Zeolites are porous rigid crystalline aluminosilicates with ion-exchange capability and are well known in the art.

Zeolites may be roughly divided into two general classes: (a) channel-pore-structure zeolites; and (b) three-dimensional-pore-structure zeolites. This classification depends on the direction of the wide, and therefore catalytically active, pores of the zeolite. The channel pore structure zeolites include L-sieve, omega-sieve and mordenite. The three-dimensional pore structures include X-sieve, Y-sieve and natural faujasite. The crystal structure of synthetic zeolite L is discussed by Barrer and Villiger in Zeitschrift für Kristallographie, Vol. 128 (March 1969), pp. 352–370. The crystal structure of zeolites A, X, Y and mordenite are discussed by Breck, D. W. in J. Chem. Ed. Vol. 41 (December 1964), pp. 678–689.

Various zeolites are well known as hydrocarbon conversion catalysts and catalyst components. Type X and Y zeolites can be used as catalytic-cracking catalysts without adding a hydrogenation metal component. When a hydrogenation-cracking catalyst is desired a hydrogenation component selected from Group VIII and Group VI–B metals may be combined with the zeolite. The Group VIII noble metals, especially palladium and platinum, and the iron group metals, especially cobalt and nickel, combined with the Group VI–B metals, especially molybdenum and tungsten, supported on X and Y zeolites, and particularly ultrastabilized Y-sieve, are well known. Normal paraffin isomerization processes using hydrogen-mordenite catalysts are also well known. For example, Benesi, U.S. Pat. No. 3,190,939 relates to a process for isomerizing $C_5$–$C_6$ hydrocarbons utilizing a hydrogen-mordenite having incorporated therein a metal selected from Group I–B, Group VI–B, Group VIII and mixtures thereof.

A large number of zeolites containing manganese ions are disclosed as hydrocarbon conversion catalysts by Plank et al. in U.S. Pat. No. 3,264,208.

Mixed zeolites having the same crystal structure have been used as hydrocarbon conversion catalyst components, particularly when mixed with an amorphous silica-alumina matrix. For example, Bertolacini et al. U.S. Pat. No. 3,597,349 relates to a physical particulate mixture of ultrastable aluminosilicate - containing silicate - alumina and cation-exchanged Y-type molecular sieves. Kimberlin et al. U.S. Pat. No. 3,686,121 relates to a hydrocarbon conversion catalyst containing a mixture of zeolites having essentially the same crystal structure, but having substantially different silica-alumina molar ratios.

Several crystalline aluminosilicates which are essentially free of hydrogenation activity are said to be useful as reforming catalysts in Coonradt et al. U.S. Pat. No. 3,533,-939. The catalyst compositions disclosed may be used alone or in combination with each other if the pore size is greater than about 6 A. units. Such zeolites include e.g., Zeolite L, faujasite, Zeolites X and Y, and the like, regardless of pore structure.

SUMMARY OF THE INVENTION

Superior selectivity and product quality are achieved in a process for hydrocracking a hydrocarbon feedstock boiling substantially above the boiling range of the desired products at elevated temperatures and pressures in the presence of hydrogen with a catalyst consisting essentially of a catalytic amount of a hydrogenation metal component selected from Group VIII, Group VI–B metals and mixtures thereof incorporated into a physically mixed zeolite support consisting of about 10–90% wt. of a channel pore structure zeolite (L-sieve; omega-sieve; mordenite) and about 90–10% wt. of a three-dimensional pore structure zeolite (X-sieve; Y-sieve; natural faujasite) which has been decationized to an alkali metal content of less than about 0.5% wt.

DETAILED DESCRIPTION

The present invention relates to a process for hydrocracking a hydrocarbon feedstock in the presence of a catalyst prepared by physically mixing a channel pore structure zeolite with a three-dimensional pore structure zeolite before incorporating a catalytic amount of a hydrogenation metal component into the mixed zeolties. Surprisingly, catalysts having a hydrogenation metal component supported on mixed base channel pore structure/three-dimensional pore structure zeolites are superior in activtiy, selectivity and product quality to comparable mixtures of catalysts having a comparable hydrogenation metal component supported on unmixed channel pore structure and three-dimensional pore structure zeolites. Although the reasons for this observed synergistic effect on hydrocarbon conversion reactions are not understood, it could result in part from a certain degree of selective incorporation of the hydrogenation metal component into one or another of the different pore structure zeolites or its preferential deposition at the interface between grains of different types of zeolites.

This method of preparing catalysts is generally applicable to mixtures of channel pore structure zeolites and three-dimensional pore structure zeolites. Examples of channel pore structure zeolites include L-sieve, omega-sieve and mordenite. Especially preferred from this group are L-sieve and mordenite. Examples of three-dimensional pore structure zeolites include X-sieve, Y-sieve and natural faujasite. Of these, Y-sieve is especially preferred. Other three-dimensional pore structure zeolites include A-sieve which is less desirable as a catalyst support because of its smaller pore size openings.

The improvement realized from this method of catalyst preparation results from mixing about 10–90% wt. of channel pore structure zeolite with about 90–10% wt. of three-dimensional pore structure zeolite. The composition of the physical mixture of zeolites can be varied within this broad range to obtain optimum results and the optimum mixture will vary depending on the hydrocarbon conversion process in which the catalyst is used. Generally mixtures within the range of 25–75% wt. of each component are preferred.

Methods for producing the various channel pore structure and three-dimensional pore structure zeolites are well known (see, e.g., U.S. Pats. 3,216,789—"L"; 3,130,007—"Y"; 3,531,243—mordenite). Suitable zeolites are commercially available. In some instances such zeolites may have a sufficiently low alkali or alkaline earth metal content to be used directly. In other instances, it will be necessary to decationize the zeolites to reduce the alkali and/or alkaline earth metal content to less than about 0.5% wt. before incorporating the hydrogenation metal component or components into the mixed zeolites. This decationization step may be accomplished either before or after mixing the channel pore structure and three-dimensional pore structure zeolites.

According to the present invention, alkali metal ions in the zeolite structure are first substantially replaced by hydrogen ions. This is suitably done by ammonium ion exchange followed by thermally driving off ammonia. Aqueous ammonium salt solutions, such as for example ammonium nitrate, carbonate, sulfate, halides, etc., are suitable for ion exchange. In most cases, multiple exchanges are desirable. The exchange is carried out by any conventional exchange procedure, either batchwise, or continuous and preferably at elevated temperatures in the range of 100° C., as for example, by refluxing the zeolite in an exchange solution. Batchwise exchange may be carried out by slurrying the zeolite with an appropriate ammonium compound such as aqueous 2 M ammonium nitrate, separating the solution by filtration or settling, then washing with water. This procedure is repeated several times. While it is necessary to reduce the alkali and/or alkaline earth metal content of the mixed zeolites to less than about 0.5% wt. to obtain a suitable hydrocarbon conversion catalyst, additional benefits are realized by reducing the alkali and/or alkaline earth metal content even lower. Preferably, the zeolites will be decationized to reduce the alkali content to less than about 0.1% wt.

The hydrogenation metal component can be incorporated into the mixed zeolite support by either impregnation, i.e., by adding a solution containing the desired amount of hydrogenation metal component to the mixed zeolite and evaporating the solvent, or by ion-exchange, i.e., by contacting the mixed zeolite with a solution containing sufficient quantity of hydrogenation metal component at a temperature and for a time sufficient to replace cations within the zeolite structure with the desired hydrogenation metals. This method of incorporation is generally preferred and is exemplified below.

The catalysts of the invention are suitable for use in various hydrocarbon conversion processes such as isomerization, hydroisomerization, hydrogenation, dealkylation, ring opening, cracking, and hydrocracking, for many catalytic applications these mixed zeolite supports are composited with hydrogenation metal components such as metals of Group VI-B (especially Mo, W), Group VIII (especially Ni, Co, Pt and Pd) of the Periodic Table of Elements. Noble metals of Group VIII (Pt and Pd) are especially suitable for hydroisomerization. Nickel-tungsten composites are especially suited for hydrocracking. The hydrogenation metals can be composited with the zeolite by various means known in the art. Platinum, for instance, is conveniently incorporated by ion-exchange of the zeolite with aqueous tetrammine platinous chloride solution in the presence of ammonium nitrate. When noble metals of Group VIII are used, it is preferred that the metal content be about 2% wt. or less. A composite containing 0.1–1.0% wt. platinum or palladium on the mixed zeolite bases of the invention provides a highly active and efficient hydroisomerization catalyst. A composite containing from about 10–40% wt. Group VIII and Group VI-B metals, and especially about 5–30% wt. nickel and about 0.05–10% wt. tungsten provides an active and stable hydrocracking catalyst.

After the metal compounds have been deposited the carrier is usually dried at an elevated temperature and subsequently calcined. The calcination is usually carried out in an oxygen-containing gas, preferably air. The calcination temperature is raised in stages to progressively higher levels and preferably will not exceed 550° C.

Catalysts prepared according to the invention are conveniently used in the form of discrete particles, such as granules, extrudates, pellets and the like, usually ranging in size from about ¹⁄₁₆ inch to about ¼ inch in average diameter. These particles are preferably disposed in a stationary bed within a suitable reactor capable of withstanding high pressure. Of course, smaller catalyst particles may be used in fluidized or slurry reactor systems. The catalyst may also be composited with a refractory oxide, such as by copelleting. This is particularly suitable where the catalysts are to be used in a fixed bed of discrete particles in which hardness and resistance to attrition are desirable. For example, pellets comprising about 25% wt. alumina and about 75% wt. mixed-zeolites having an incorporated hydrogenation metal component, can be used as isomerization catalysts. However, the concentration of zeolite in relation to the concentration of refractory oxide can be varied as desired. Mixtures of refractory oxides, such as silica-alumina, can also be used if desired.

Suitable feedstocks for hydrocracking processes employing catalysts of the invention include any hydrocarbon boiling above the boiling range of the desired products. For gasoline production, hydrocarbon distillates boiling in the range of about 200–500° C. are preferred. Such distillates may have been obtained either from distillation of crude oils, coal tars, etc., or from other processes generally applied in the oil industry such as thermal, catalytic, or hydrogenative cracking, visbreaking, deasphalting, deasphaltenizing or combinations thereof. Since these catalysts are active and stable in the presence of nitrogen and sulfur compounds, hydrofining the feedstock is optional.

Operating conditions appropriate for a hydrocracking process using the present catalyst include temperatures in the range of about 260° C. to 450° C., hydrogen partial pressure of about 500 to 2000 p.s.i., liquid hourly space velocities (LSV) of about 0.2 to 10, preferably 0.5 to 5, and hydrogen/oil molar ratios of about 5 to 50.

Feed can be introduced into the reaction zone as a liquid, vapor or mixed liquid-vapor phase depending upon the nature, pressure and amount of hydrogen mixed with the feed and the boiling range of the feedstock utilized. The hydrocarbon feed, including fresh as well as recycle feed, is usually introduced into the reaction zone with a large excess of hydrogen since the hydrocracking is accompanied by a rather high consumption of hydrogen, usually of the order of 500–2000 standard cubic feet of hydrogen per barrel of feed. Again, any suitable hydrogen containing gas which is predominantly hydrogen can be used. The hydrogen rich gas may optionally contain nitrogen contaminants from a feed pretreating process.

The following examples further illustrate the practice and advantages of the invention.

EXAMPLE I

The mixed zeolite catalyst supports of the invention are decationized by any convenient method, such as ion-exchange, to reduce the alkali metal content of the zeolite to less than about 0.5% wt. before incorporating the hydrogenation metal component. The decationization process can be done either before or after mixing the three-dimensional and channel pore structure zeolites. This example illustrates a method of reducing the alkali metal content of the zeolites before they are mixed.

An ultrastabilized Y-sieve produced by Davison Chemical Division of W. R. Grace Co., and hereinafter designated as D-Y, was selected as a three-dimensional pore structure zeolite. This zeolite contained about 2% wt. sodium as purchased. This stabilized Y-sieve was decationized by contacting for instance, 200 grams of the Y-sieve five times with 1000 ml. of boiling 1 M aqueous ammonium nitrate solution for one hour. Finally the treated zeolite was dried at 100° C. for at least 2 hours, and then calcined in air for two hours each at 200°, 350° and 500° C.

Linde SK-45 L-sieve produced by Linde Division of Union Carbide, and hereafter designated as L—L, was selected as one example of a channel pore structure zeolite. This zeolite contained about 10% wt. potassium as purchased. Its silicon-to-aluminum weight ratio was greater than 3.1. It was decationized by contacting for instance 100 grams of the zeolite with 1000 ml. of boiling 2 M aqueous ammonium nitrate solution for 2 hours, given a staged calcination to 500° C. for 2 hours at each temperature level and repeating this procedure four times. The residual potassium content was 0.06% wt.

A mordenite zeolite produced by Norton Co., and hereafter designated as N-M, was selected as another example of a channel pore structure zeolite. This zeolite contained 0.25% wt. sodium as purchased. It was used as such or further decationized to a residual sodium content of about 0.02% wt. by contacting 100 grams of the zeolite with 1000 ml .of 1 M aqueous ammonium nitrate solution for one hour at boiling temperature.

EXAMPLE II

A stabilized L-sieve (L-S) was obtained from Linde SK-45 zeolite, having a Si/Al weight ratio greater than 3.1, by ion-exchanging for instance 100 grams of zeolite three times with 1000 ml. of 2 M aqueous ammonium nitrate solution for two hours each at boiling temperature and staged calcination in air at 100°, 200°, 350° and 500° C. for two hours at each of the four temperature levels. The zeolite was then ion-exchanged with 1 M buffered aqueous rare earth (mixture) nitrate solution at boiling temperature, given a staged calcination at 100°, 200°, 350°, 500° and 700° C. followed by four additional combined ammonium nitrate exchange treatments and staged calcinations, as before, to 500° C. The exchanged zeolite had a benzene sorption capacity of 7% wt. at room temperature, a residual potassium content of 0.05% wt. and contained less than 0.3% wt. rare earths. The silicon/aluminum weight ratio had increased by 40% (from about 3.2 to 4.5) as a result of this treatment.

A 50/50 mixture of the stabilized L-sieve (L-S) and decationized Davison ultrastabilized Y-sieve (0.18% wt. sodium) was finally exchanged four times at boiling temperature with a saturated aqueous nickel acetate solution containing approximately stoichiometric amounts of ammonium metatungstate to incorporate 16.6% wt. nickel and 1.2% wt. tungsten.

The finished catalyst powder was pelletized and crushed to obtain granules of 8 to 14 mesh (U.S.) and then was calcined in air for two hours each at 200°, 300° and 500° C. It had an average bulk density of 0.59 g./ml. and a benzene sorption capacity of 8.1% wt.

EXAMPLE III

The catalyst from Example II was tested in two, once-through hydrocracking process runs (i.e., no recycle) at 1500 p.s.i.g. and a 10 to 1 hydrogen to oil molar ratio for 75% conversion of a gas-oil feedstock to material boiling less than 199° C. The feedstock was a hydrotreated (4.4 p.p.m. residual nitrogen) mixed straight run/catalytically cracked/coker gas oil having an API gravity of 31.5°, an estimated molecular weight of 230, an aromatics content of 37% v., and a boiling range of about 390 to 690° F. (0.5% wt. sulfur was added to the feed). In both cases the catalysts was pretreated in situ at atmospheric pressure with a gas mixture of 10% $H_2S$ in hydrogen flowing at a rate of about 3000 volume/volume/hour. Temperature was raised from 200° C. to 500° C. at about 50° C. per half hour while sulfiding the catalyst and maintained at 500° C. for three hours prior to introducing feed at the desired lower temperature.

One hydrocracking test was conducted at 1.0 LHSV. The catalyst was very active initially, reaching plateau conditions (i.e., relatively stable conversion temperatures) at 320° C. after only 48 days of operation. The catalyst operated stably at this conversion temperature for the remaining 21 days of the test. Yield and product quality data are shown in Table I.

Also included in Table I for comparison are hydrocracking test results obtained on the same feed and under similar operating conditions for nickel-tungsten catalysts supported on stabilized L-sieve and stabilized Y-sieve unmixed zeolites. Although these unmixed zeolite catalysts contained somewhat different metal contents, and the stabilized L-sieve catalyst was operated at a slightly different space velocity (1.5 LHSV), the test results indicate the improvement that can be achieved by utilizing a mixed zeolite base catalyst. The mixed zeolite base catalyst showed surprisingly good selectivity to heavy gasoline (73.8% wt.) over a wide temperature range (from 285° C. to 320° C.). The heavy gasoline fraction amounted to only 67.7% wt. for the stabilized Y-sieve base catalyst at around 330° C. (2.0 LHSV) and to only 63.7% wt. for the stabilized L-sieve base catalyst at 343° C. and higher (1.5 LHSV). As to product quality, the mixed based catalyst produced a low paraffin concentration in the reformer feed as expressed by a paraffin/naphthene/aromatics (P/N/A) concentration of 27/63/10% v. as compared to 30/57.5/12.5% v. for stabilized Y-sieve base at a 10° C. higher temperature, and 25/63/12% v. for stabilized L-sieve base at a more than 20° C. higher temperature.

TABLE I

| Catalyst base | Stabilized L-sieve (L-S) | 50% L-S/50% D-Y | Stabilized Y-sieve (D-Y) |
|---|---|---|---|
| Promoter metals, percent wt. | 12.0% wt. Ni, 2.8% wt. W | 16.6% wt. Ni, 1.2% wt. W | 22.7% wt. Ni, 1.5% wt. W |
| Space velocity, v./v./hr. | 1.5 | 1.0          2.0 | 2.0 |
| Operating temperature, ° C. | 343-366 | 285-320   340-345 | 327-330 |
| Products, percent wt.: | | | |
| $C_1$-$C_3$ | 2.6 | 1.2          1.9 | 1.9 |
| Total $C_4$ | 10.7 | 7.5          8.3 | 9.1 |
| $C_5$-$C_6$ | 23.0 | 17.5        19.7 | 21.3 |
| $C_7$—199° C. | 63.7 | 73.8        70.1 | 67.7 |
| Iso/normal ratios, wt.: | | | |
| $C_4$ | 2.0 | 3.0          2.1 | 2.5 |
| $C_5$ | 7.7 | 7.1          9.7 | 8.1 |
| $C_6$ | 13 | 15            21 | 15 |
| Reformer feed quality, percent v.: | | | |
| Paraffins | 25 | 27            27 | 30 |
| Naphthenes | 62.5 | 63            59 | 57.5 |
| Aromatics | 12.5 | 10            14 | 12.5 |

The second test run was conducted at 2.0 LHSV. Doubling the space velocity required a 20° C. higher conversion temperature and led to a less stable operation. This indicates that hydrocracking processes over mixed zeolitic supported catalysts should be limited to about 1.5

LHSV. Otherwise, the 2.0 LHSV test run showed good yields and product quality. The heavy gasoline fraction amounted to 70.1% wt. between 340° C. and 345° C. with a P/N/A split of 27/59/14% v. The shape selective features were obviously preserved.

EXAMPLE IV

A mixed base zeolite consisting of 67% wt. potassium-free, decationized L-sieve (L–L) and 33% sodium-free ultastabilized Y-sieve (D–Y) was prepared. This mixture was then ion-exchanged four times at boiling temperature with a saturated aqueous nickel acetate solution containing approximately stoichiometric amounts of ammonium metatungstate to incorporate 18.4% wt. nickel and 2.0% wt. tungsten into the mixed base. The catalyst was then dried at 100° C. for several hours after which it was pelletized, crushed and calcined as in Example II. The finished catalyst had an average bulk density of 0.59 g./ml. and a benzene sorption capacity of 6.1% wt. The catalyst was given a sulfiding pretreatment as in Example III and tested in the laboratory by hydrocracking a very refractory catalytically cracked gas oil which had been hydrotreated to reduce the nitrogen content to 4.2 p.p.m. This feedstock had an API gravity of 25.0°, and estimated molecular weight of 216, an aromatics content of 53% v. and a boiling range from about 500–700° F. (0.5% wt. sulfur was added to the feed).

After 30 to 40 days processing this feedstock at 1500 p.s.i.g., 1.0 LHSV, 10/1 hydrogen/oil molar ratio and 67% conversion once-through to products boiling below 199° C., the catalyst achieved plateau conditions at conversion temperatures between 330 and 335° C. During the last 16 days of a 56 day run the catalyst showed good stability, with an increase in conversion temperature requirement of only about 2° C. during the period.

For comparison purposes hydrocracking tests on the same feed and under similar operating conditions were made for nickel-tungsten catalysts supported on unmixed stabilized L-sieve base and on unmixed stabilized Y-sieve base. The results obtained with the Y-sieve base catalyst are not directly comparable since they were obtained at a 2.0 LHSV instead of 1.0 LHSV used for the mixed base catalyst. Results of these tests are shown in Table II.

dimensional pore structure zeolites were retained by the mixed zeolite base catalyst in that high selectivity to gasoline (71.0% wt.) was paired with high catalytic reformer feed quality as shown by a P/N/A composition of 16.5/63.5/20.0% v.

EXAMPLE V

A mixed zeolite base catalyst was prepared using a 50/50 Norton mordenite (N–M)/Davison ultastabilized Y-sieve (D–Y) base containing 16.5% wt. nickel and 1.2% wt. tungsten. The hydrogenation metals were incorporated by the method employed in Example II. The finished catalyst had a bulk density of 0.64 g./ml. and a benzene sorption capacity of 7.4% wt. This catalyst was tested in a hydrocracking process at both 1.0 and 2.0 LHSV to process the 4.4 p.p.m. nitrogen-containing hydrotreated mixed gas oil described in Example III (0.5% wt. sulfur was added to the feed in all tests).

At 1.0 LHSV, 1500 p.s.i.g. and 10/1 hydrogen/oil molar ratio the catalyst was very active, initially achieving 75% conversion once-through of feedstock to less than 199° C. product at a temperature of about 260–270° C. The temperature requirement increased fairly rapidly over the first 30 days of the test to about 280–285° C. and then continued to increase more slowly until 55 days processing time when the temperature requirement reached a stable plateau at about 320° C. Yield and product quality data for this test are shown in Table III. The data indicate very good selectivity to heavy gasoline (about 71% wt.) over a fairly wide temperature range (from 295–320° C.). In addition to good iso/normal ratios for $C_4$ (around 2.8), $C_5$ (between 9 and 15), and $C_6$ (about 50), the catalyst showed a low paraffin concentration in the reformer feed fraction as expressed by a P/N/A concentration of 25/64/11% v.

The test run at 2.0 LHSV was conducted on the same feedstock and at otherwise identical operating conditions. In this run, the catalyst reached a plateau temperature of 341° C. in about 35 days after which the temperature requirement increased more slowly to about 346° after 60 days total processing time. This high temperature requirement indicates that hydrocracking processes using mordenite/Y-sieve mixed base catalyst should be op-

TABLE II

| Catalyst base | L-sieve (L–L) | 67% wt. L-sieve (L–L) 33% wt. Y-sieve (D–Y) | Y-sieve (D–Y) |
|---|---|---|---|
| Promoter metals, percent wt. | 22% wt. Ni, 1.6% wt. W | 18.4% wt. Ni, 2.0% wt. W | 20% wt. Ni, 2.2% wt. W |
| Space velocity, v./v./hr. | 1.0 | 1.0 | 2.0 |
| Operating temperature, ° C. | 345 | 325–338 | 340 |
| Products, percent wt.: | | | |
| $C_1$–$C_3$ | 3.5 | 2.2 | 2.2 |
| Total $C_4$ | 11.0 | 7.8 | 8.6 |
| $C_5$–$C_6$ | 22.6 | 19.0 | 20.9 |
| $C_7$—199° C | 62.9 | 71.0 | 68.3 |
| Iso/normal ratios, wt.: | | | |
| $C_4$ | 1.4 | 1.5 | 1.3 |
| $C_5$ | 5 | 6 | 8 |
| $C_6$ | 10 | 12 | 15 |
| Reformer feed quality, percent v.: | | | |
| Paraffins | 14.0 | 16.5 | 22.0 |
| Naphthenes | 61.5 | 63.5 | 56.0 |
| Aromatics | 24.5 | 20.0 | 22.0 |

The catalyst supported on L-sieve base showed lower selectivity to heavy gasoline (62.9% wt.) than the catalyst supported on ultrastabilized Y-sieve (68.3% wt). However, the quality of the fraction itself was higher for the L-sieve base catalyst as characterized by a paraffin/naphthene/aromatic (P/N/A) composition of 14.0/61.5/24.5% v. compared to 22.0/56.0/24.0% v. for the catalysts supported on ultrastabilized Y-sieve. The advantages of both the channel pore structure and threeerated at less than 2.0 LHSV, most likely around 1.5 LHSV. Otherwise, the 2.0 LHSV processing test showed good yields and product quality. As shown in Table III, selectivity to heavy gasoline varied between 70.3% wt. at 337° C. and 68.5% wt. at 345° C. Iso/normal ratios for $C_4$ (2.0), $C_5$ (between 7 and 12), and $C_6$ (between 20 and 30) are attractive, as is the P/N/A composition of the reformer feed fraction (25/61/14% to 26/59/15% v.).

TABLE III

| Catalyst base | 50/50 mixed bases, N-M/D-Y | | | | 50/50 mixed catalysts | |
|---|---|---|---|---|---|---|
| | | | | | N-M | D-Y |
| Promoter metals | 16.5% wt. Ni, 1.2% wt. W | | | | 14.1% wt. Ni, 1.7% wt. W | 17.6% wt. Ni, 1.4% wt. W |
| LHSV, v./v./hr | 1.0 | 1.0 | 2.0 | 2.0 | 2.0 | |
| Operating temperature, °C | 296-314 | 318-321 | 337-340 | 345-346 | 347-352 | |
| Products, percent wt.: | | | | | | |
| $C_1$-$C_3$ | 1.9 | 1.6 | 1.7 | 2.0 | 2.9 | |
| Total $C_4$ | 8.9 | 8.5 | 8.6 | 9.1 | 11.5 | |
| $C_5$-$C_6$ | 18.1 | 19.0 | 19.4 | 20.4 | 23.1 | |
| $C_7$-199° C | 71.1 | 70.9 | 70.3 | 68.5 | 62.5 | |
| Iso/normal ratios, wt.: | | | | | | |
| $C_4$ | 2.7 | 2.9 | 2.1 | 2.0 | 1.7 | |
| $C_5$ | 8.8 | 15.3 | 7.1 | 11.8 | 8.2 | |
| $C_6$ | 50 | 50 | 20 | 30 | 18 | |
| Reformer feed quality, percent v.: | | | | | | |
| Paraffins | 25 | 25 | 25 | 26 | 26.5 | |
| Naphthenes | 64 | 64 | 61 | 59 | 57 | |
| Aromatics | 11 | 11 | 14 | 15 | 16.5 | |

A 50/50 mixture of the two single base catalysts prepared by incorporating nickel-tungsten into the individual N-M mordenite and D-Y sieve zeolites was tested at 2.0 LHSV on the same feed and under the same operating conditions used for the mixed base zeolite catalyst. The mordenite catalyst contained 14.1% wt. nickel and 1.7% wt. tungsten. This catalyst had a 0.67 g./ml. bulk density and a 4.4% wt. benzene sorption capacity. The D-Y base catalyst contained 17.6% wt. nickel and 1.4% wt. tungsten incorporated into the decationized ultrastabilized Y sieve prepared as in Example I. This catalyst had a 0.65 g./ml. bulk density and a 10.1% wt. benzene sorption. Test results for this physical catalyst mixture are shown in Table III for comparison purposes. Catalyst activity was lower for the physical catalyst mixture as indicated by a plateau temperature after 60 days processing time of 352° C. compared to 346° C. for the mixed base catalyst. Selectivity to catalytic reformer feed was substantially poorer (62.5% wt. vs. 68.5% wt.). Iso to normal ratios in the $C_4$, $C_5$, and $C_6$ fractions were also less attractive (1.7/8.2/18 vs. 2.0/11.8/30) and the paraffin content in the lower volume $C_7$ + product fraction was still somewhat higher despite the higher operating temperature (26.5% v. vs. 26% v.).

I claim as my invention:

1. A process for hydrocracking which comprises contacting a hydrocarbon feedstock boiling substantially above the boiling range of the desired products at elevated temperatures and pressures in the presence of hydrogen with a catalyst consisting essentially of a catalytic amount of a hydrogenation metal component selected from the group consisting of the Group VIII and Group VI-B metals of the periodic chart incorporated into a physically mixed zeolite powder support, said zeolite mixture consisting of about 10-90% wt. of channel pore structure zeolite selected from the group consisting of L-sieve and mordenite with about 90-10% wt. of three-dimensional pore structure Y-sieve zeolite and having an alkali metal content of less than about 0.5% wt.

2. The process of claim 1 wherein the alkali metal content of the mixed zeolite support is less than about 0.1% wt.

3. The process of claim 1 wherein the hydrogenation metal component is 5-30% wt. nickel and 1-15% wt. cobalt, nickel, molybdenum and tungsten metal compounds.

4. The process of claim 3 wherein the hydrogenation metal component is 5-30% wt. nickel and 1-5% wt. tungsten and the alkali metal content of the mixed zeolite support is less than about 0.1% wt.

5. The process of claim 1 wherein the mixed zeolite support consists of about 25-75% wt. of channel pore structure zeolite and about 75-25% wt. of three-dimensional pore structure Y-sieve zeolite.

6. The process of claim 5 wherein the hydrogenation metal component is 5-30% wt. nickel and 1-15% wt. tungsten, the channel-pore structure zeolite is decationized mordenite and the three-dimensional pore structure zeolite is decationized Y-sieve zeolite, said catalyst having an alkali metal content less than about 0.1% wt.

7. The process of claim 5 wherein the hydrogenation metal component is 5-30% wt. nickel and 1-15% wt. tungsten, the channel-pore structure zeolite is decationized L-sieve zeolite, said catalyst having an alkali metal content less than about 0.1% wt.

References Cited

UNITED STATES PATENTS

| | | | |
|---|---|---|---|
| 3,617,491 | 11/1971 | Csicsery | 208—60 |
| 3,640,905 | 2/1970 | Wilson | 252—455 |
| 3,758,402 | 9/1973 | Oleck et al. | 208—111 |
| 3,238,123 | 3/1966 | Voorhies et al. | 208—264 |
| 3,267,023 | 8/1966 | Miale et al. | 208—111 |
| 3,533,939 | 10/1970 | Coonradt et al | 208—135 |
| 3,597,349 | 8/1971 | Bertolacini et al. | 208—111 |
| 3,686,121 | 8/1972 | Kimberlin et al. | 252—455 |
| 3,764,520 | 10/1973 | Kimberlin et al. | 208—120 |
| 3,769,202 | 10/1973 | Plank et al. | 208—120 |

DELBERT E. GANTZ, Primary Examiner

G. E. SCHMITKONS, Assistant Examiner

U.S. Cl. X.R.

252—455 Z, 477 R